United States Patent [19]

Rosenberry, Jr.

[11] 4,335,972

[45] Jun. 22, 1982

[54] APPARATUS HAVING POSITIONING AND MOUNTING MEANS FOR JOINING TWO PARTS AND METHOD OF USING SAME

[75] Inventor: George M. Rosenberry, Jr., Hendersonville, Tenn.

[73] Assignee: General Electric Co., Schenectady, N.Y.

[21] Appl. No.: 150,860

[22] Filed: May 19, 1980

[51] Int. Cl.³ .............................................. F16B 1/00
[52] U.S. Cl. .................................... 403/11; 403/337; 403/27; 29/526 R
[58] Field of Search .................... 403/11, 13, 14, 337, 403/408, 27; 29/526

[56] References Cited

U.S. PATENT DOCUMENTS

| | | | |
|---|---|---|---|
| 1,908,592 | 5/1933 | Flather | 403/337 X |
| 2,528,343 | 10/1950 | Davis | |
| 3,065,000 | 11/1962 | Stanton | |
| 3,168,171 | 2/1965 | Gaare | 29/526 X |
| 3,257,720 | 6/1966 | Siler | |
| 3,493,249 | 2/1970 | Conrad, Jr. et al. | |
| 4,035,093 | 7/1977 | Redshaw | |

FOREIGN PATENT DOCUMENTS 649902 2/1979 U.S.S.R. ............................... 403/337

*Primary Examiner*—Andrew V. Kondrat
*Attorney, Agent, or Firm*—Vale P. Myles

[57] ABSTRACT

An apparatus including a first part, a second part, a plurality of spaced apertures in the first part and a plurality of holding devices for holding the first part against the second part. The plurality of apertures are each selectively sized so a first of the apertures forms a close clearance fit with one of the holding devices on at least one diameter of the first aperture. A second of the apertures forms an equally close clearance fit, on one of its diameters, with a second of the holding devices, but forms a looser clearance fit with the second holding device on a second diameter thereof, which generally parallels a line between the first and second apertures. The remainder of the plurality of apertures each form a substantially looser fit with an associated holding device than is formed by either of said close clearance fits. In the method of the invention the first part is positioned adjacent the second part, a holding device is inserted through the first aperture and tightened to a final torque value, the second part is then rotated around the first holding device to enable a second holding device to be inserted through the second aperture without interference therewith, the second holding device is then tightened to a final torque value, and the remaining holding devices are each inserted, respectively, through the remaining apertures and tightened to thereby join the second part to the first part in a predetermined alignment therewith.

17 Claims, 5 Drawing Figures

APPARATUS HAVING POSITIONING AND MOUNTING MEANS FOR JOINING TWO PARTS AND METHOD OF USING SAME

BACKGROUND OF THE INVENTION

The invention relates to apparatus including at least two parts that are mounted in aligned and fixed relationship and then joined together. The apparatus includes means for readily aligning the two parts and mounting them in a preselected joined relationship. More particularly, the invention relates to apparatus that includes a first part having a plurality of spaced apertures that are adapted to have bolts or other holding means inserted through them, in combination with a second part provided with spaced, threaded holes for receiving such bolts so that the bolts or other holding means can be used to clamp the first part to the second part when they are aligned and mounted in fixed relationship according to the invention. In an alternative embodiment, a rabbet fit is provided between the first and second parts in place of one of the apertures and associated bolts in said plurality of spaced apertures. The disclosed embodiment also includes a method for practicing the invention to mount a first and second part of such an apparatus in a predetermined aligned and fixed relationship.

A great variety of coupling methods and systems are well known for joining two components of an assembly in a desired fixed and aligned relationship. In general, such known prior art techniques and apparatus can be divided into three separate categories. One such category is exemplified by U.S. Pat. No. 3,493,249-Conrad, Jr., et al, wherein concentric bushings are often used in combination with joining bolts or other holding means for providing a small clearance fit between the bolt shaft and the bushings, while at the same time reducing the size of clearance fit between the bushings and the walls of apertures through parts that are secured together by the bolts. A second category of prior art technology for securing two parts in aligned and fixed relationship is shown, for example, in either U.S. Pat. Nos. 2,528,343-Davis or 3,065,000-Stanton. As disclosed in those patents, one of a pair of parts that is to be joined together is provided with a plurality of spaced apertures that each have diameters sized to provide a relatively close clearance fit for bolts or other holding means adapted to be inserted through the apertures. A second part to be joined by such bolts to the first part is provided with a plurality of spaced apertures that are substantially larger, along one of their respective diameters, than the largest diameter of a matched aperture in the first part. With such system, the bolts or holding means can be inserted through the relatively small-diameter apertures in the first part, then fitted loosely through the apertures in the second part, after which the second part can be moved relative to the first part in a direction so that movement of the second part parallel to the relatively long axis of the apertures is achieved thereby to obtain a desired snug fit between the bolts and one end, or side of the elongated apertures in the second part. A common modification of the technology in this second category is shown in U.S. Pat. No. 4,035,093-Redshaw which discloses an apparatus including two plate members that are joined together. Each of the plate members is provided with a plurality of spaced apertures having major longitudinal axes and minor transverse axes. The apertures in the first plate are arranged to overlap the respective apertures in the second plate in approximately a perpendicular relationship. With this type of apparatus, bolts can be readily positioned between the matched pairs of apertures at the junction of their axes and the plates can be secured in a relatively wide range of different positions, as determined by the linear extent of the two sets of elongated apertures.

Finally, the various types of prior art mounting end aligning techniques known to the applicant include aligning and joining methods that require the use of a plurality of precisely machined, low tolerance clearance, aligning and mounting apertures and associated bolts and bolt receiving holes arranged respectively in precisely aligned relationship in two members of an apparatus that are to be joined together. An example of such a relatively expensive to implement, precision machined mounting method is shown in U.S. Pat. No. 3,257,720-Siler where, as disclosed in that patent, two parts are joined together by precisely machining a single locator hole in one of the parts to receive therein a holding bolt. Other threaded bolt holes are positioned on the first member at spaced points that are each located within a predetermined tolerance at selected positions on the first member. In similar fashion, a single precisely machined locator aperture is formed in the second member to be aligned exactly with the locator hole in the first member. In addition, a plurality of other apertures are provided in the second member, each located within a predetermined tolerance relative to the position of the first locator hole in the second member so that the respective apertures in the second member are in alignment with matching holes in the first member, within the range of tolerance buildup afforded by the tolerance clearances between the first locator hole, the holding bolt and the associated aperture, and including the tolerance clearance between any given matched hole in the first member and a juxtaposed aperture in the second member.

Although the various aligning and joining methods known in the prior art are suitable for certain applications, each of them is limited in at least one of two important respects. Generally speaking, such prior art methods either provide relatively inaccurate alignment between the parts that are joined together, as is indicated by the first two categories of prior art patents discussed above, or alternatively, in those cases where better precision alignment is obtained, relatively expensive precision machining is required to practice the method and careful, time-consuming assembly procedures are required to achieve the desired accurate alignment of two joined parts, as is explained for example in the type of method disclosed in the Siler patent discussed above.

It would be very advantageous in many manufacturing operations to provide aligning and joining apparatus and techniques whereby two parts of an assembly could be quickly and efficiently joined together in precise alignment at a relatively low cost. One application in which such an improved apparatus and method is particularly desirable is in the aligning and mounting of annular air baffles in closely spaced concentric relationship around the rotor of electric motors or generators. In order to illustrate one preferred embodiment of the present invention the disclosure of the invention presented herein will be made in connection with its application to such an air baffle mounting and aligning apparatus and method.

SUMMARY OF THE INVENTION

In one preferred form of the invention, a two-part apparatus, such as an electric motor end cap and an associated air baffle member are provided respectively, with a plurality of spaced apertures formed in the first part, such as the baffle, and a plurality of associated, threaded holes formed in the second part, such as the motor and cap. Suitable holding means, such as threaded bolts in this embodiment of the invention, are inserted through the respective apertures of the first part into the threaded holes of the second part to secure the two parts in aligned and fixed relationship. The plurality of apertures in the first part includes at least three apertures each of which are different in size or configuration with respect to one another. The first generally circular aperture is positioned adjacent to one edge of the first part and is formed to have a predetermined close clearance fit with the holding bolt inserted through it. The second generally elongated aperture is positioned approximately diametrically opposite the first aperture on the first part and is formed to have its longitudinal axis positioned generally parallel to said diameter and in alignment with the first aperture. The second aperture is also formed to have the same close clearance fit on its shorter, or transverse axis, with the bolt inserted through it, that is provided by the clearance fit between said first aperture and its associated holding bolt. A looser clearance fit along the longitudinal axis of the second aperture is provided to prevent interference between the associated holding bolt and the edges of the aperture. The third aperture, and any of a plurality of additional apertures that may be desired to firmly secure the first part to the second part, are spaced from the first and second apertures and each such additional aperture is formed to provide a looser clearance fit with a holding bolt inserted through it than is provided between the respective holding bolts and either the first or second aperture through the first part. In an alternative form, the first aperture and associated holding bolt are replaced by formations on the respective parts that define a rabbet fit for positioning the second part relative to the first part with respect to a first direction of movement, for example in the radial direction.

In practicing the method of the invention to align and mount the first part in joined relationship to the second part, a bolt is inserted through the first aperture in the first part and rotated into the threaded hole in the second part until the head of the bolt is clamped snugly against the first part. The first part, which in the preferred embodiment is an air baffle, is then rotated around the bolt inserted through said first aperture in order to bring the longitudinal axis of the second aperture into alignment with the axis of a matching threaded hole in the second part, so that a holding bolt can be readily inserted through the second elongated aperture in the first part and threaded into the associated threaded hole in the second part and tightened to a desired final torque value thereby to secure the bolt head against the first part. Finally, holding bolts are inserted through the third and any additional apertures in the first part, into associated threaded holes in the second part and are rotated to tighten them to a predetermined torque force, thereby to complete the mounting of the first part on the second part. Precision alignment is thus achieved between the first and second parts without requiring either the use of precision machining of all of the matching holes and apertures, or careful, time-consuming orientation of each of the holes and matching apertures in the respective parts of the apparatus.

A primary object of the present invention is to provide an apparatus and method for readily and inexpensively aligning and mounting in fixed relationship two parts of an apparatus while avoiding the disadvantages of prior art mounting and aligning technology.

Another object of the invention is to provide a mounting and aligning apparatus and method that enables two parts of an assembly to be aligned within predetermined conventional tolerances while eliminating the need to use precision machining of each mounting aperture and associated holding bolt or other holding means.

A further object of the invention is to provide a mounting means and apparatus that enables a manufacturer to quickly assemble two parts in precisely aligned relationship without requiring precision measurements and additional machining of either part, once the respective parts have been provided with a set of characteristically formed apertures in one part and matching threaded holes for receiving holding bolts in the other part.

Yet another object of the invention is to provide a mounting means and method in which a plurality of holding bolts can all be tightened to their final torque value at the time they are first inserted in threaded holes in the second of two joined parts, and the first part is accurately aligned with the second part so that subsequent bolts can be inserted into associated threaded holes without interference with the second part of the assembly.

Additional objects and advantages of the invention will become apparent to those skilled in the art from the description of it presented herein, considered in connection with the accompanying drawings.

BRIEF DESCRIPTION OF THE PREFERRED EMBODIMENT

Figure 1:
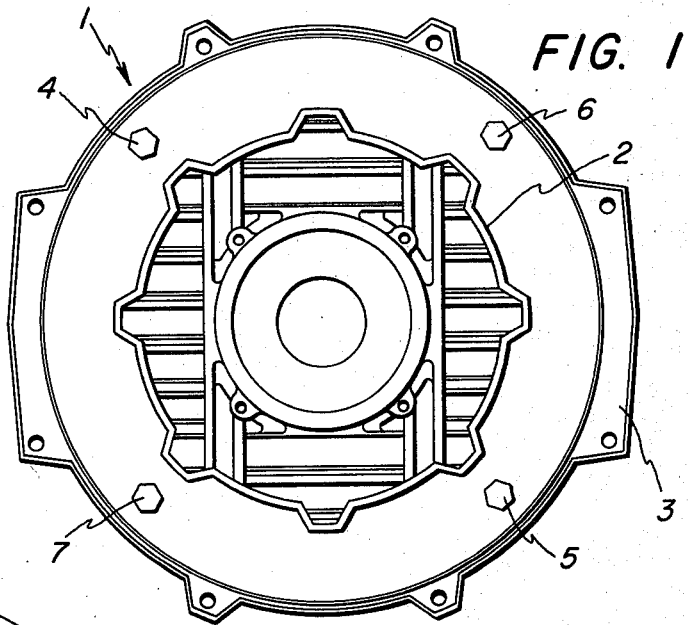
FIG. 1 is a perspective view of a two-part apparatus constructed as a preferred embodiment of the invention and including means for readily and accurately aligning and mounting the two parts of the apparatus in joined relationship.

As stated above, one preferred embodiment of the apparatus of the invention disclosed herein is a two-part assembly comprising an electric motor end cap and an air baffle member of a type that is particularly suitable for application of the subject invention. It should be understood that the invention can be practiced on a wide variety of other types of two-part apparatus to achieve the objectives and advantages of the invention discussed above. Referring now to FIG. 1, there is shown a two-part apparatus 1 that comprises a first part 2, which in this instance is an annular molded air baffle formed of a suitably rugged commercially available resin material. The air baffle is mounted on a second part 3, which is a generally circular, louvered end cap for a dynamo-electric machine such as an electric motor or generator. The particular louver arrangement and hub portion of the second part 3 are not of importance with respect to an understanding of the present invention, thus, those features will not be further described here. A plurality of threaded holding means 4, 5, 6 and 7, each of which is a threaded bolt in this form of the invention, is also provided. In alternative forms of the invention, rather than using conventional bolts for the holding means 4–7, it should be understood that the threaded holding means need only be generally formed so that each of them is provided with a shaft that is adapted to be threaded into one of the threaded holes (described below) in the second part 3 to afford the holding function that will be discussed more fully below. Also, in such a modification, each of the holding means generally must include a head portion that is larger in diameter than its associated threaded shaft. Thus, rather than using threaded bolts in practicing certain embodiments of the invention, it may be desirable to employ for the holding means of some forms of the invention a plurality of threaded studs and associated threaded nuts to provide the enlarged head portions of the holding means. As the description of the invention proceeds, it will become clear that in still other forms of the invention drive screws, such as commercially available self-tapping screws, can be used to secure a second part in alignment with a first part according to the invention.

Figure 1A:
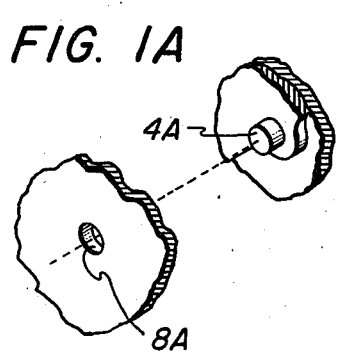
FIG. 1A is a perspective, exploded fragmentary view of portions of an apparatus such as that shown in FIG. 1, wherein an aperture and bolt in the embodiment of FIG. 1 have been replaced by a rabbet fit surface on the respective parts to illustrate an alternative embodiment of the invention.

Moreover, in a second form of the invention disclosed herein, one of the holding means may be replaced by rabbet-fit arrangement, such as that shown in FIG. 1A. Further description of that form of the invention will be given after the first preferred embodiment has been more fully discussed.

Figure 2:
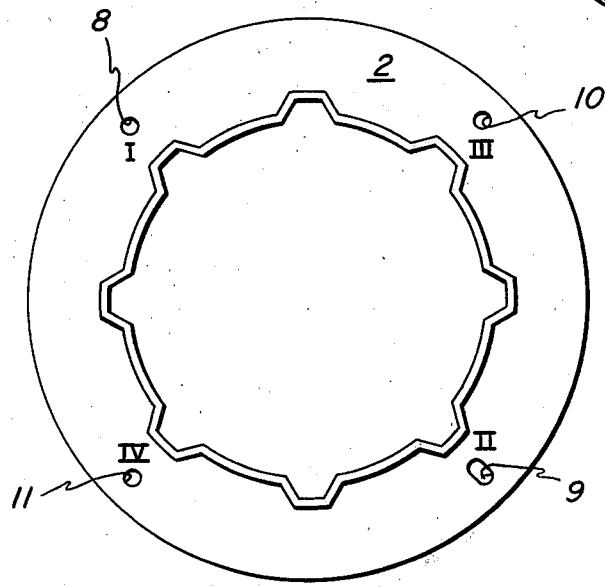
FIG. 2 is a plan view of the first part of the apparatus shown in FIG. 1, illustrating a plurality of holding means used with the first preferred embodiment of the invention shown in FIG. 1, to secure the first part to the second part according to the method of the invention.

To describe the characteristic features of the first preferred apparatus of the invention in greater detail, reference is now made to FIG. 2 where the first part 2 is shown in plan view with four apertures 8, 9, 10 and 11 formed in it at spaced points, which in this embodiment are each adjacent the outer edge of the first part 2 and are each arranged on quadrature axes of the first part 2. The relative sizes and configurations of the apertures 8–11 will be described in greater detail below after the second part 3 of the apparatus 1 is described in more detail.

Figure 3:
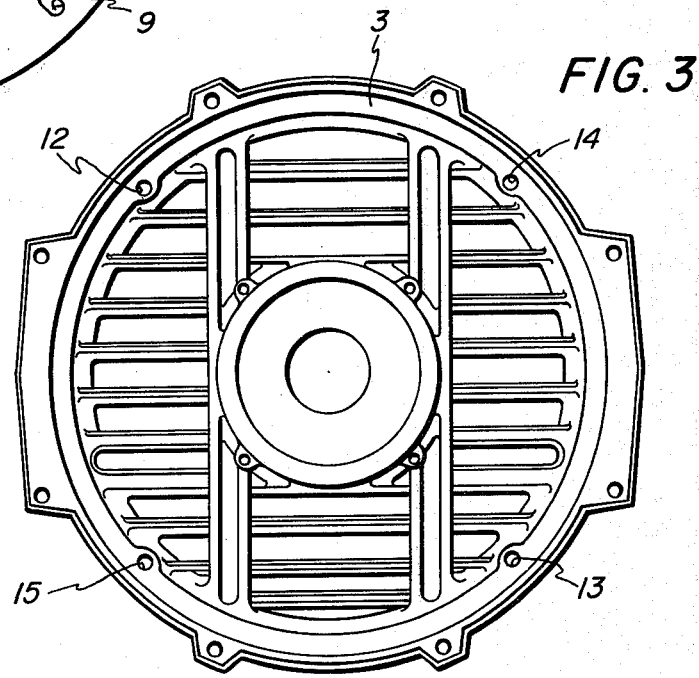
FIG. 3 is a plan view of the second part of the apparatus shown in FIG. 1 illustrating a plurality of spaced, threaded holes thereon for receiving the threaded holding means illustrated in FIG. 2, which are used to secure the two parts of the apparatus together according to the invention.

Referring now to FIG. 3, there is shown a plan view of the second part 3 of the apparatus 1, which according to the invention includes a plurality of threaded wall means 12, 13, 14 and 15 each of which define a threaded hole in the second part. The threaded holes 12–15 are arranged at spaced points on the second part 3, which in this embodiment places them on quadrature axis of that part. Thus, it will be seen that the holes 12–15 are positioned to be in general alignment with the apertures 8–11 in the first part 2 when the first and second part are mounted in aligned position as shown in FIG. 1. Each of the holes defined by the wall means 12–15 is formed to receive in threaded relationship therein one of the holding means or bolts 4–7.

Refer once again to FIGS. 2 and 2A of the drawing, in order to more clearly see the plurality of apertures 8–11 formed in the first part of the apparatus 1 of this embodiment of the invention. According to the invention, the apertures 8–11 are arranged at spaced points on the first part 2 so as to position each aperture in sufficiently close alignment, respectively, with each of the holes 12–15 (seen in FIG. 3) in the second part 3 to enable each of the holding means or bolts 4–7 (seen in FIG. 1) to be inserted, respectively, through the apertures and into the threaded holes in the second part 3; when assembly of the part is achieved according to the invention, as illustrated in FIG. 1. It should be understood at this point, that in order to practice the invention, a variety of different numbers of apertures may be used in the first part 2, in combination with matching threaded holes in the second part 3. However, in practicing the invention at least three such apertures should be used, and in the form of the invention being disclosed here four apertures are shown.

According to the invention, the apertures in the first part 2 are numbered in sequence to designate the order in which the respective holding means should be mounted in the apertures according to the method of the invention which will be discussed more fully below; thus, the designating numbers I, II, III and IV are moulded into the surface of the first part 2, respectively adjacent the first aperture 8, the second aperture 9, the third aperture 10 and the fourth aperture 11. Of course, other suitable indicia may be used in alternative embodiments of the invention to identify the appropriate sequence for securing the first part 2 onto the second part 3 according to the invention.

Figure 2A:
FIG. 2A is a fragmentary plan view of a portion of the first part of the apparatus shown in FIG. 2.

The respective apertures in the first part 2 are further characterized according to the present invention, in that the first aperture 8 is formed to have at least two spaced diameters each of which define a predetermined close clearance fit with the shaft of one of the holding means, such as the bolt 4, when it is positioned in the aperture. In this embodiment, the two diameters are equal to one another, because the first aperture 8 is round. Similarly, the second aperture 9 has a first diameter that defines a predetermined close clearance fit with the shaft of another one of said holding means, such as the bolt 5 shown in FIG. 1, when it is positioned therein. The second aperture 9 is formed to be generally elliptical in configuration with its longitudinal axis generally in alignment with a diameter line of the first part 2 that extends between the first aperture 8 and the second aperture 9. This generally elliptical, or elongated-slot configuration is best seen in FIG. 2A of the drawing. The first diameter of the second aperture 9, just mentioned, is aligned with, or generally parallel to, the transverse axis of the aperture, as the aperture is depicted in FIG. 2A. A second diameter of the aperture 9, which is the longitudinal axis thereof and is about perpendicular to the first or transverse diameter, is formed to define a substantially looser clearance fit with the shaft of the holding means 5 when it is inserted through the aperture 9. It will be understood that other configurations than the generally elliptical form for the second aperture 9 illustrated in FIG. 2A may be employed in alternative embodiments of the invention. For example, if the second aperture 9 is bored, rather than molded, it will preferably be a round hole. However, it is important to assure that with any form of the second aperture 9 that uses an elongated aperture, it be provided with a radially extending longitudinal axis that has a diameter substantially greater than the transverse axis of the aperture, which transverse axis must be made with a closer clearance fit with the shaft of the associated holding means, or bolt, that is adapted to be inserted through it. With that characteristic arrangement, the first part 2 of the apparatus 1 may be rotated around the bolt 4 that has been positioned in the first aperture 8 and torqued down to a preselected force, thereby to quickly and easily align the longitudinal axis of the second aperture 9 with the threaded hole 13 in the second part 3. Thus, the bolt 5 can be inserted through the aperture 9 and threaded into the hole 13 in the second part without requiring any further machining of the aperture 9 or any adjustment in a radial direction of the first part 2, in order to avoid interference between the bolts and the second part.

If a round hole is bored for the second aperture, rather than using an elongated second aperture, in practicing an alternative embodiment of the invention, the diameter of the second aperture should be made a sufficient length (X) greater than the diameter of the first aperture to enable the second bolt 5 to be inserted through the second aperture and threaded into the first part without interferring with the second part. The added diameter length (X) should equal the maximum possible displacement in a radial direction, with respect to a redirect of the second part, afforded by machining tolerances build-up between the first bolt 4, its associated threaded hole and the second aperture 9. In such an embodiment the remaining apertures, such as 10 and 11 discussed below, would be made with diameters equal to that of the first aperture plus a length equal to about 2X.

The third aperture 10 in the first part 2 is formed to have all of its diameters sized to define a loose clearance fit with the shaft of the bolt 6 or other suitable holding means adapted to be positioned therein when the apparatus 1 is assembled, as shown in FIG. 1. As can be best seen in FIG. 2, in this embodiment of the invention the first aperture 8 and the third aperture 10 are generally circular in configuration while the second aperture 9 is generally elliptical, as explained above with reference to FIG. 2A. In other embodiments of the invention, different configurations of the first, second and third apertures can be employed without departing from the teaching of the invention, so long as the relative clearance fits described above are maintained for the respective diameters of those apertures. Similarly, although the second aperture 9 in this form of the invention, as best seen in FIG. 2A, is formed so that its minimum diameter sides are substantially parallel to one another for a predetermined length adjacent their midpoint, thereby to enable the holding means 5 to be readily inserted through the aperture 9 at different spaced points along its longitudinal axis, other suitable configurations for the aperture, such as a simple rectangular configuration or other parallel-sided aperture may be used so long as the sides of the aperture, that are separated by the minimum diameter of the aperture afford the required relatively close clearance fit with the shaft of bolt 5 in the manner described above. In this preferred embodiment the second aperture 9 is positioned on the first part 2 so that it is approximately diametrically opposite the first aperture 8, thereby to afford maximum leverage for turning the first part 2 about the shaft of a bolt 4 threaded into the hole 12 and inserted through the first aperture 8, as a first step in aligning the baffle 2 with the end cap 3. In alternative embodiments of the invention the second aperture 9 may be disposed at other relative locations on the part 1, with respect to the first aperture 8. Precision tolerances need not be maintained in positioning the second aperture relative to the first aperture in the first part, so long as the second aperture is positioned to overlap the second threaded hole 13 in the second part, when moved into alignment with it. However, the sides of the second aperture that are separated by the minimum diameter of the aperture should be maintained parallel to a line between the central axis of the first aperture 8 and the second aperture 9 in order to permit a holding means, such as bolt 5, to be easily and quickly inserted through the second aperture 9 even though the first part 2 is shifted radially the maximum distance permitted by the respective manufacturing tolerances for the first aperture 8 in the baffle 2 and for the threaded hole 12 in the end cap 3.

In addition to the basic three apertures in the first part 2 required to practice the present invention, a predetermined number of additional threaded walls may be provided to define additional holes in the second part 3, and a like predetermined number of of additional apertures may be formed through the first part 2 at spaced points that are arranged respectively in sufficiently close alignment with the holes in the second part to enable one of a plurality of additional holding means, such as the bolt 7 illustrated in FIG. 3, be inserted through such additional aperture and into an adjacent threaded hole in the end cap 3. In the embodiment of the invention disclosed here, only one such additional aperture 11 in the first part and associated threaded hole 15 in the second part of the apparatus 1 is illustrated. However, regardless of the number of such additional apertures and associated threaded holes used in alternative embodiments of the invention, each such additional aperture should be formed to have all of its diameters sized to define a relatively loose clearance fit with the shaft of one of the holding means, such as the bolt 7 shown mounted through the aperture 11 and threaded into the hole 15 in the assembled form of the invention illustrated in FIG. 1. To simplify manufacture of such additional apertures and associated threaded holes in alternative embodiments of the invention, and for best holding power of the bolts, each such additional aperture should be made about the same size and shape as the third aperture. Thus, to practice the invention it is only necessary to provide three different sizes or configurations of apertures in the first part 2; namely, a first aperture that has a close clearance fit with the shaft of a holding means, a second aperture, such as aperture 9 shown in FIGS. 2 and 2A, which has a close clearance fit on its minimum diameter with the shaft of an associated holding means, while having a looser clearance fit on a longitudinal, radially extending, axis and a third type of aperture such as the third and fourth apertures, 10 and 11, shown in FIG. 2 which may be of the same size and which each are formed to afford a looser clearance fit between their respective diameters and the shaft portions of associated bolts or other holding means inserted therethrough.

In order to provide a more detailed understanding of the preferred embodiment of the invention, it should be understood that for the preferred form of the invention herein described certain relative dimensional sizes have been found to be particularly suitable for practicing the invention to mount the baffle 2 in aligned fixed relationship on the end cap 3. Specifically it has been found desirable to form the smallest diameter of the second aperture 9 in the first part 2 so that it is about equal, within a predetermined tolerance range, to the largest diameter of the first aperture 8 in the baffle 2. In addition, the smallest diameter of the third aperture 10 in the baffle 2 should be at least 20% larger, within a predetermined tolerance range, than the smallest diameter of the second aperture 9 in the first part. In a prototype constructed according to these teachings a predetermined tolerance range employed relative to the dimensions for the respective first, second and third apertures in the baffle 2 was maintained at about ±10% of each given diameter for each aperture with which they were associated. With such easily achievable manufacturing tolerances, and use of the relatively different sized and shaped apertures in the baffle 2, according to the invention, it has been found that the baffle 2 can be quickly and easily mounted in accurately aligned position on the end plate 3 without requiring additional expensive machining or assembly operations. And, most importantly, such a mounting is performed by tightening each of the holding bolts only once, because the bolts are torqued to their desired tightness at the time they are initially inserted into their respective threaded bolt holes, rather than requiring a separate alignment of the second part after all the bolts are first loosely positioned on the bolt holes, according to common prior art practice.

Now that a first preferred embodiment has been described, reference is made to FIG. 1A to describe an alternative embodiment, which may be preferred for some applications of the invention where a first and a second part having inter-locking rabbet-fit surfaces are to be joined in accurately aligned relationship. In this alternative embodiment such a rabbet-fit can be used in place of the first aperture (8) and associated bolt 4, to achieve accurate positioning of the second part 3 relative to the first part 2, in at least one direction of movement, such as in a radial direction. It should be understood that although simplified rabbet-fit surfaces are shown as in FIG. 1A, in order to explain simple analysis with the first embodiment shown in FIG. 1, various other rabbet surfaces could be used in other modifications of the invention, consistent with the teachings herein.

In the embodiment shown in FIG. 1A, it is to be understood that only the rabbet-fit structure used in place of the first aperture 8 and the holding means 4 illustrated in the other Figures of the drawing is changed, i.e., the remainder of the apertures 9–11 and holding means 5–7, as well as the other features of first part 2 and second part 3 are essentially the same as shown and described above with reference to FIGS. 1–3. Thus, in FIG. 1A there is shown a rabbet boss 4A formed by a suitable molding process on the surface of the first part, or baffle 2, which abuts the second part 3. A corresponding rabbet hole 8A is machined, or otherwise suitably formed in the surface of the second part adapted to abut the baffle. The boss is formed with a predetermined tolerance to fit into the rabbet hole 8A, thereby to position the first part in a predetermined position radially relative to the second part. Rather than employing a clearance fit between the rabbet boss 4A and rabbet hole 8A, an interference fit can be used in this form of the invention, but such an interference fit must not be so severe that it prevents the first part from being rotated around the boss 4A, as an axis, when the invention is practiced to quickly position the second aperture in alignment to enable the bolt 5 to be threaded into the second hole 13 in the end cap 3. Of course, the rabbet boss 4A can also be formed to define a predetermined close clearance fit with the rabbet hole 8A, on at least one of the diameters thereof, which is essentially aligned with a radius of the end cap 3 intersecting the hole 8A.

The operation of this alternative embodiment of the invention is believed to be clear from the description of the operation and method given above and hereafter, with reference to FIGS. 1–3; however, it may further assist in understanding this embodiment to point out that although an interference fit between the boss 4A and the hole 8A could serve as a holding means, at least partly analagous in function to the holding means 4 shown in FIG. 1, in those forms of the invention where a clearance fit exists in the rabbet fit between boss 4 and hole 8, only the other three holding means 5–8 would be relied on to join the first part 2 to the second part 3. In fact, only the second and third holding means 5 and 6 would be required to accurately align and join the parts in this instance, as suggested by the description of the first embodiment, but to better distribute the holding forces around the baffle 2, particularly where a clearance rabbet fit is used, the three holding means 5–7 are used in this preferred embodiment.

The operation of the invention described above should be apparaent to those skilled in the art from the foregoing description of it; however, in order to assure a complete understanding of the invention, a preferred method of assembling the two-part apparatus illustrated in FIG. 1 can be practiced by applying the following steps. After providing a first part, such as the baffle 2, formed with apertures similar to those described above, and also providing a second part, such as the end cap 3 provided with threaded holes in the manner discussed above, and finally providing a plurality of holding means such as the bolts 4–7 shown in FIG. 1, then the baffle 2 is positioned adjacent to the end cap with the first aperture 8 generally aligned with the threaded hole 12 in the end cap. A bolt 4 is then inserted through the aperture 8 and threaded into the hole 12 and tightened until the head portion of the bolt clamps the baffle 2 against the end cap 3 with the desired final torque value for the assembly. Next, the baffle 2 is rotated around the bolt 4 in order to align the second aperture 9 in the baffle with a second hole 13 in the end cap, and a second holding means, such as the bolt 5 shown in FIG. 1, is inserted through the second aperture and threaded into the hole 13 until the head portion of bolt 5 is also engages the baffle, to further clamp it against the end cap 3 with the desired predetermined final torque force for this bolt in the assembly. Finally, with the bolts 4 and 5 securing the baffle 2 in fixed relationship with the end cap 3 so that the third aperture 10 and fourth aperture 11 are sufficiently aligned respectively with the threaded holes 14 and 15 in the end cap to enable additional bolts to be threaded into them, due to the relative sizes and dimensions of the respective holes as described above, a third bolt, such as the bolt 6 is threaded into the hole 14 until its head portion further clamps the first member or baffle 2 against the second member or end cap 3 with a final desired torque force. A similar procedure is then used to insert another bolt 7 into the threaded aperture 15 and rotate it into secured position to better hold the baffle 2 in alignment with the end cap 3.

From the foregoing description of the invention, it will be apparent that various modifications and alternative forms of it may be practiced without departing from the scope of the invention; accordingly, it is my intention to define the limit and true scope of the invention by the following claims.

What I claim and desire to secure by Letters Patent of the United States is:

1. An apparatus comprising a first part, a second part juxtaposed with the first part and holding means for joining the first and second parts in fixed and aligned relationship, characterized by the improvement comprising:
   (a) at least three threaded walls defining holes at spaced points in said second part,
   (b) a plurality of threaded holding means each formed with a shaft adapted to be threaded into one of said holes in the second part, and each including a head portion larger in diameter than said shaft,
   (c) at least three apertures through said first part at spaced points arranged to position each aperture in sufficiently close alignment, respectively, with each of said holes in the second part to enable each of said holding means to be inserted respectively through said apertures and into the holes in the second part, said apertures having the following different relative sizes and configurations;
      (i) the first aperture having at least one diameter that defines a predetermined close clearance fit with the shaft of one of said holding means positioned therein,
      (ii) the second aperture having one diameter that defines a predetermined close clearance fit with the shaft of one of said holding means positioned therein, and having a second diameter about perpendicular to the first diameter, said second diameter defining a substantially looser clearance fit with the shaft of said holding means,
      (iii) the third aperture having all of its diameters sized to define a loose clearance fit with the shaft of one of said holding means positioned therein.

2. An apparatus as defined in claim 1, including a predetermined number of additional threaded walls defining holes in the second part, and a predetermined number of additional apertures through the first part at spaced points arranged, respectively, in sufficiently close alignment with the holes in said second part to enable one of said holding means to be inserted through each aperture and into the adjacent hole in the second part, each of said additional apertures having all of its diameters sized to define a loose clearance fit with the shaft of one of said holding means positioned therein.

3. An apparatus as defined in claim 2, wherein each of said additional apertures is about the same size and shape as said third aperture.

4. An apparatus as defined in claim 1, wherein the first and third apertures in said first part are generally circular and said second aperture is generally elliptical or elongated.

5. An apparatus as defined in claim 4, wherein the minimum diameter sides of said second aperture are substantially parallel to one another for a predetermined length adjacent their midpoints.

6. An apparatus as defined in claim 1, wherein said first and second apertures in the first part are substantially diametrically opposed to one another, and said first aperture is positioned adjacent to an edge of the first part.

7. An apparatus as defined in claim 6, wherein the smallest diameter of the second aperture in said first part is larger by at least the sum of the tolerances for the first aperture and the first holding means, within a predetermined tolerance range, than said at least one diameter of the first aperture in said first part.

8. An apparatus as defined in claim 7, wherein the smallest diameter of the third aperture in said first part is larger by at least the sums of the tolerances of the first aperture, the first holding means and the second aperture, within a predetermined tolerance range, than the smallest diameter of the second aperture in said first part.

9. An apparatus as defined in claim 8, including numbers or symbols each positioned on the first part respectively adjacent said first, second and third apertures therein to sequentially designate said apertures in that order, thereby to designate the order in which holding means should be threaded into said apertures.

10. An apparatus as defined in claim 1, except that said second aperture is circular rather than having a first and second diameter, and the diameter of said second aperture defines a looser clearance fit with the shaft of the holding means associated with it than is defined by the first holding means and first aperture.

11. An apparatus as defined in claim 10, wherein the diameter of said second aperture is greater than the diameter of said first aperture by a length at least as great as the tolerance build-up afforded by the tolerances for the first aperture and first holding means, thereby to enable the second holding means to be threaded into the first part without encountering interference from the edges of said second aperture.

12. An apparatus comprising a first part, a second part juxtaposed with the first part and means for joining the first and second parts in fixed and aligned relationship, characterized by the improvement comprising:
   (a) at least two walls defining two holes at spaced points in said second part,
   (a-1) wall means defining a rabbet hole or functionally equivalent rabbet surface on said second part,
   (b) a plurality of holding means each formed with a shaft adapted to be secured into one of said two holes in the second part, and each including a head portion larger in diameter than said shaft,
   (c) at least two apertures through said first part at spaced points arranged to position each aperture in sufficiently close alignment, respectively, with each of said two holes in the second part to enable each of said holding means to be inserted respectively through said apertures and into one of the two holes in the second part,
   (c-1) wall means defining a rabbet boss or functionally equivalent rabbet surface on the first part, said boss being spaced from said apertures in the first part, said apertures in the first part and the rabbet hole in the second part having the following different relative sizes and configurations;
      (i) said rabbet hole having at least one diameter that defines a predetermined close fit with the rabbet boss on the first part,
      (ii) one aperture of said two apertures having one diameter that defines a predetermined close clearance fit with the shaft of one of said holding means positioned therein, said one aperture being positioned about diametrically opposite the boss rabbet on said first part, (iii) the second aperture of said two apertures having all of its diameters sized to define a loose clearance fit with the shaft of one of said holding means positioned therein.

13. A method for assembling the apparatus defined in claim 1 comprising the steps of;
   (a) positioning the first part adjacent the second part with the first aperture generally aligned with a threaded hole in the second part, placing one of said holding means through the first aperture and threading it into the hole aligned therewith until the head portion of the holding means clamps the first part against the second part with a predetermined final clamping force,
   (b) rotating the first part around the holding means inserted through said first aperture, thereby to align the second aperture in the first part with a second threaded hole in the second part, placing a second of said holding means through the second aperture and threading it into the hole aligned therewith until the head portion of second holding means clamps the first part against the second part, with a predetermined final force,
   (c) inserting a third of said holding means through said third aperture and threading it into the hole aligned therewith until the head portion of the said third holding means further clamps the first part against the second part with a predetermined final clamping force.

14. A method of aligning and joining a first part with a second part comprising;
   (a) forming at least three threaded holes in said second part at spaced points thereon,
   (b) providing a plurality of threaded holding means each formed with a shaft adapted to be threaded into the spaced holes in said second part and each including a head portion larger in diameter than said shaft,
   (c) forming at least three apertures through said first part at spaced points that are adapted to be positioned in sufficiently close alignment with the holes in the second part to enable each of a plurality of holding means to be inserted, respectively, through each of said apertures and threaded into the holes in the first part;
      (i) forming the first of said apertures to have a predetermined close tolerance fit on at least one diameter with the shaft of one of said holding means,
      (ii) forming the second of said apertures to have a predetermined close tolerance fit on a first diameter with the shaft of one of said holding means and to have a substantially looser clearance fit with said shaft on a second diameter perpendicular to the first diameter, said first diameter being about perpendicular to a line between the axes of said first and second apertures,
      (iii) forming the third of said apertures to have a predetermined loose fit clearance on all of its diameters with the shaft of one of said holding means,
   (d) positioning said first part adjacent said second part with said first aperture generally aligned with a hole in the second part, placing one of said holding means through said first aperture and threading it into the hole aligned therewith until the head portion of the holding means clamps the first part against the second part,
   (e) rotating the first part around the holding means inserted through said first aperture, thereby to align the second aperture in the first part with a second hole in said second part, placing a second of said holding means through the second aperture and threading it into the hole aligned therewith until the head portion of said second holding means clamps the first part against the second part, and
   (f) inserting a third of said holding means through said third aperture and threading it into the hole aligned therewith until the head portion of said third holding means clamps the first part against the second part.

15. A method of aligning and joining a first part to a second part comprising the steps:
   (a) forming a plurality of spaced apertures in the first part, and forming a rabbet surface on the first part spaced from said apertures and eccentric to the axis of said first part,
   (b) forming a rabbet surface on the second part eccentric to the axis of said second part and arranged to define a rabbet fit with the rabbet surface on the first part, thereby to position said first part in a predetermined position relative to one direction of movement between said first and second parts, while permitting movement between the first and second parts in a second direction of movement between said first and second parts when the rabbet surfaces are arranged in said rabbet-fit relationship,
   (c) providing a plurality of holding means each adapted to extend through one of the respective apertures in said first part and into engagement with the second part, thereby to hold the first part to the second part with predetermined final holding forces exerted on the first part by each of said holding means when they are initially secured, respectively, to said second part,
   (d) positioning the rabbet surface on the first part in engagement with the rabbet surface on the second part to form a rabbet fit between them,
   (e) rotating the first part relative to the second part in said second direction to rotate the first part around said rabbet fit as an axle to thereby align one of said apertures with a predetermined location on said second part,
   (f) inserting one of said holding means through said one of said apertures and securing the holding means to said predetermined location on said second part, and
   (g) inserting another of said holding means through another of said apertures and securing it to the second part thereby to clamp the first part to the second part with a predetermined final force.

16. A method as defined in claim 15 wherein the rabbet surface on the first part is a boss, the rabbet surface on the second part is a hole adapted to receive said boss in a rabbet fit therein, and said plurality of holding means each comprise a compression fastener.

17. A method as defined in claim 15, wherein the rabbet surface on the first part and the rabbet surface on the second part form an interference fit at the rabbet-fit surfaces thereof when joined together.

* * * * *